US012711199B1

(12) United States Patent
Ganesan et al.

(10) Patent No.: US 12,711,199 B1
(45) Date of Patent: Aug. 18, 2026

(54) DATA AUGMENTATION SIMULATOR

(71) Applicant: NTT DATA Services, LLC, Plano, TX (US)

(72) Inventors: Dhurai Ganesan, Chennai (IN); Aananthanarayanan Pandian, Chennai (IN); Angelene Ravichandran, Chromepet (IN); Harsh Vinayak, Gurgaon (IN)

(73) Assignee: NTT Data Services, LLC, Plano, TX (US)

(*) Notice: Subject to any disclaimer, the term of this patent is extended or adjusted under 35 U.S.C. 154(b) by 1285 days.

(21) Appl. No.: 17/371,312

(22) Filed: Jul. 9, 2021

(51) Int. Cl.

| | |
|---|---|
| ***G06F 18/21*** | (2023.01) |
| ***G06F 17/17*** | (2006.01) |
| ***G06F 18/2134*** | (2023.01) |
| ***G06F 18/214*** | (2023.01) |
| ***G06F 18/2321*** | (2023.01) |
| ***G06N 3/063*** | (2023.01) |
| ***G06N 5/022*** | (2023.01) |
| ***G06N 20/00*** | (2019.01) |

(52) U.S. Cl.
CPC .......... *G06F 18/2148* (2023.01); *G06F 17/17* (2013.01); *G06F 18/21345* (2023.01); *G06F 18/2321* (2023.01); *G06N 3/063* (2013.01); *G06N 5/022* (2013.01); *G06N 20/00* (2019.01)

(58) Field of Classification Search
CPC ................ G06F 18/2148; G06F 17/17; G06F 18/21345; G06F 18/2321; G06N 3/063; G06N 5/022; G06N 20/00
See application file for complete search history.

(56) References Cited

U.S. PATENT DOCUMENTS 11,496,501 B1 * 11/2022 Liu .......................... G06N 5/04
2003/0139828 A1 * 7/2003 Ferguson ................. G06E 1/00
(Continued)

OTHER PUBLICATIONS

Abdi, Lida, and Sattar Hashemi. "To combat multi-class imbalanced problems by means of over-sampling techniques." IEEE transactions on Knowledge and Data Engineering 28.1 (2015): 238-251. (Year: 2015).*
(Continued)

*Primary Examiner* — Ryan Barrett
(74) *Attorney, Agent, or Firm* — Patterson + Sheridan, LLP

(57) ABSTRACT

In an embodiment, a method includes receiving input data. The method also includes collecting data attributes from the input data based on a type of the input data. The method also includes classifying the input data using the data attributes. The method also includes performing class-imbalance removal on the classified input data, the performing yielding a balanced dataset. The method also includes creating integrated data using the balanced dataset, the integrated data including the balanced dataset integrated with data-attribute intelligence. The method also includes representing at least a portion of the integrated data as structured knowledge for execution of a particular task. The method also includes applying a plurality of extrapolation algorithms to the structured knowledge to yield raw augmented data. The method also includes generating an extrapolated dataset using the raw augmented data. The method also includes constructing a synthetic dataset based on the extrapolated dataset.

18 Claims, 8 Drawing Sheets

(56) References Cited

U.S. PATENT DOCUMENTS

| | | | | |
|---|---|---|---|---|
| 2011/0246483 | A1* | 10/2011 | Darr | |
| 2014/0031260 | A1* | 1/2014 | O'Donnell | C12Q 1/6886 506/9 |
| 2014/0257122 | A1 | 9/2014 | Ong et al. | |
| 2014/0344208 | A1* | 11/2014 | Ghasemzadeh | G16H 50/50 706/52 |
| 2015/0278241 | A1* | 10/2015 | Bates-Haus | G06F 16/1748 707/692 |
| 2016/0063394 | A1* | 3/2016 | Gokalp | G06F 16/9538 706/12 |
| 2016/0092789 | A1 | 3/2016 | Codella et al. | |
| 2017/0039345 | A1* | 2/2017 | Röder | G16H 50/20 |
| 2018/0247227 | A1* | 8/2018 | Holtham | G06N 99/005 |
| 2018/0247549 | A1* | 8/2018 | Martin | G09B 5/02 |
| 2021/0312642 | A1* | 10/2021 | Zhang | G06F 18/22 |
| 2022/0108771 | A1* | 4/2022 | Steingrimsson | G16B 40/00 |
| 2023/0055263 | A1* | 2/2023 | Zhong | G06N 3/0455 |

OTHER PUBLICATIONS

Iosifidis, Vasileios, Besnik Fetahu, and Eirini Ntoutsi. "Fae: A fairness-aware ensemble framework." 2019 IEEE international conference on big data (big data). IEEE, 2019. (Year: 2019).*

Sahoo, Subham, Christoph Lampert, and Georg Martius. "Learning equations for extrapolation and control." International Conference on Machine Learning. Pmlr, 2018. (Year: 2018).*

Sirmacek, Beril, and Max Kivits. "Semantic segmentation of skin lesions using a small data set." arXiv preprint arXiv:1910.10534 (2019). (Year: 2019).*

Daniel, Johnnie, Sampling Essentials: Practical Guidelines for Making Sampling Choices, Dec. 27, 2012, Sage Publications, 125-174 (Year: 2012).*

Paula Branco, Luís Torgo, Rita P. Ribeiro, "A Survey of Predictive Modelling under Imbalanced Distributions", May 14, 2015, pp. 1-48.

* cited by examiner

596

| Correlation Analysis | |
| --- | --- |
| **Correlation analytics rules** – correlation coefficient that indicates the strength of the relationship between two variables which can be found using the formula<br>$r_{xy}$ – the correlation coefficient of the linear relationship between the variables x and y<br>$x_i$ – the values of the x-variable in a sample<br>$\bar{x}$ – the mean of the values of the x-variable<br>$y_i$ – the values of the y-variable in a sample<br>$\bar{y}$ – the mean of the values of the y-variable | **Formula**<br>$r_{xy} = \frac{\Sigma(x_i - \bar{x})(y_i - \bar{y})}{\sqrt{\Sigma(x_i - \bar{x})^2 \Sigma(y_i - \bar{y})^2}}$<br>-1: Perfect negative correlation.<br>0: No correlation.<br>1: Perfect positive correlation.<br>The variables tend to move in the same direction |

FIG. 5

DATA AUGMENTATION SIMULATOR

BACKGROUND

Technical Field

The present disclosure relates generally to artificial intelligence and more particularly, but not by way of limitation, to data augmentation systems and methods.

History of Related Art

Advancements in artificial intelligence (AI) have paved a way for complex array of solutions across broad industrial spectrums such as insurance and finance. AI technology has the ability to adapt the way humans make decisions. Although AI delivers a wide range of applications, its effectiveness is often limited by data size and quality. For example, even a large dataset may not include samples for every scenario to be addressed by a given AI algorithm.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of simulating data augmentation. The method includes receiving input data. The method also includes collecting data attributes from the input data based, at least in part, on a type of the input data. The method also includes classifying the input data using the data attributes. The method also includes performing class-imbalance removal on the classified input data, the performing yielding a balanced dataset. The method also includes creating integrated data using the balanced dataset, the integrated data including the balanced dataset integrated with data-attribute intelligence. The method also includes representing at least a portion of the integrated data as structured knowledge for execution of a particular task. The method also includes applying a plurality of extrapolation algorithms to the structured knowledge to yield raw augmented data. The method also includes generating an extrapolated dataset using the raw augmented data. The method also includes constructing a synthetic dataset based, at least in part, on the extrapolated dataset. Other embodiments of this aspect include corresponding computer systems, apparatus, and computer programs recorded on one or more computer storage devices, each configured to perform the actions of the methods.

In an embodiment, another general aspect includes a computer system having a processor and memory. The processor and the memory in combination are operable to perform a method. The method includes receiving input data. The method also includes collecting data attributes from the input data based, at least in part, on a type of the input data. The method also includes classifying the input data using the data attributes. The method also includes performing class-imbalance removal on the classified input data, the performing yielding a balanced dataset. The method also includes creating integrated data using the balanced dataset, the integrated data including the balanced dataset integrated with data-attribute intelligence. The method also includes representing at least a portion of the integrated data as structured knowledge for execution of a particular task. The method also includes applying a plurality of extrapolation algorithms to the structured knowledge to yield raw augmented data. The method also includes generating an extrapolated dataset using the raw augmented data. The method also includes constructing a synthetic dataset based, at least in part, on the extrapolated dataset.

In an embodiment, another general aspect includes a computer-program product. The computer-program product includes a non-transitory computer-usable medium having computer-readable program code embodied therein. The computer-readable program code is adapted to be executed to implement a method. The method includes receiving input data. The method also includes collecting data attributes from the input data based, at least in part, on a type of the input data. The method also includes classifying the input data using the data attributes. The method also includes performing class-imbalance removal on the classified input data, the performing yielding a balanced dataset. The method also includes creating integrated data using the balanced dataset, the integrated data including the balanced dataset integrated with data-attribute intelligence. The method also includes representing at least a portion of the integrated data as structured knowledge for execution of a particular task. The method also includes applying a plurality of extrapolation algorithms to the structured knowledge to yield raw augmented data. The method also includes generating an extrapolated dataset using the raw augmented data. The method also includes constructing a synthetic dataset based, at least in part, on the extrapolated dataset.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 5 illustrates an example of functionality that can be performed by a correlation rules engine.

DETAILED DESCRIPTION

In certain embodiments, data processing can occur via artificial intelligence (AI), such as machine learning (ML) algorithms, that is applied to incoming data streams. In various cases, the data processing can involve performing particular tasks with respect to the incoming data streams. The particular tasks can involve, for example, predicting data, generating new data, performing configurable workflows, combinations of the foregoing and/or the like. AI can use various techniques to learn to perform the particular tasks, without being explicitly programmed for the tasks, in some cases using training data that is of a same format as the incoming data stream. For example, AI can encompass various types of ML algorithms such as, for example, decision tree learning, association rule learning, artificial neural networks (including deep learning and, in particular, feed forward networks), inductive logic programming, support vector machines, clustering, Bayesian networks, reinforcement learning, representation learning, similarity and metric learning, sparse dictionary learning, genetic algorithms, rule-based ML, gradient boosting, ML based on generalized linear modeling, random forest, ensemble learning, combinations of the foregoing and/or the like.

Data is typically the crux and core of ML and AI algorithms. Comprehensive datasets are usually needed. This is because, with conventional ML and AI, data quality and quantity play a major role in attaining success. If the data is limited, prediction accuracy, for example, is adversely impacted. While the quantity and quality of some data tends to grow continuously, it is speculated that there will a data downfall in terms of data scarcity with respect to at least some types of data.

Data scarcity can be problematic because, during data analysis, it becomes a greater concern to balance a dataset by retrieving a good number and representation of samples. Oftentimes, comprehensive datasets simply are not feasible. Small data may be the future of data science. When a dataset is small and slow to develop, many years may be needed to learn and/or wait for appropriate data. Further, data scarcity can result in poor performance during learning processes. Inaccurate or inappropriate AI-based decisions may result. The present disclosure describes examples of systems and methods for enabling data augmentation. Examples will be provided below relative to the Figures.

Figure 1:
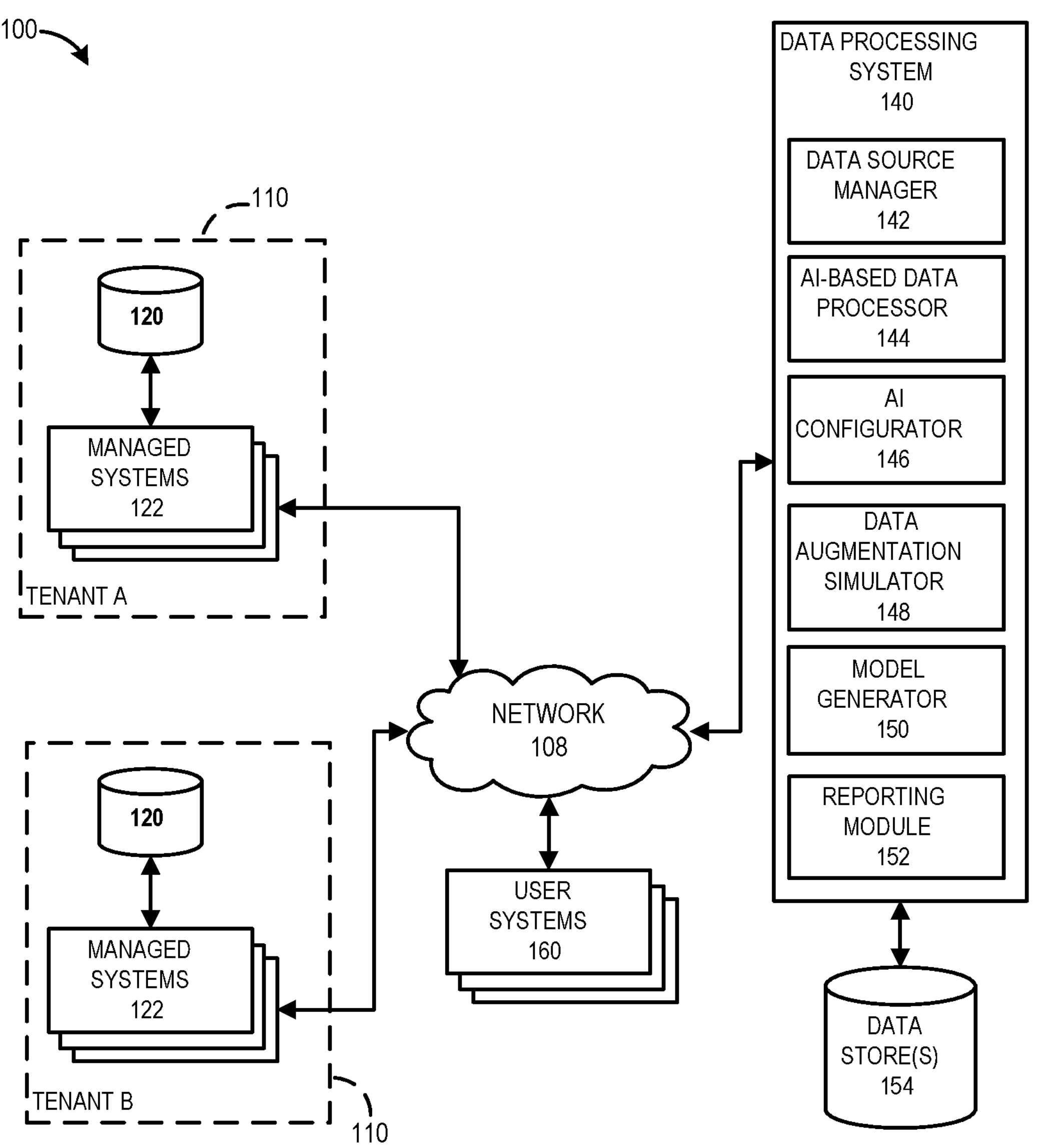
FIG. 1 illustrates an example of a computing environment for implementing a data processing system.

FIG. 1 illustrates an example of a computing environment 100 for implementing a data processing system 140. The computing environment 100 includes the data processing system 140, tenant systems 110, user systems 160 and data store(s) 154, each of which is operable to communicate over a network 108. The network 108 may be a private network, a public network, a local or wide area network, a portion of the Internet, combinations of the same, and/or the like.

In certain embodiments, the data processing system 140 can centrally manage AI-based data processing of data sources for its tenants. In particular, in the computing environment 100, the tenant systems 110 can be served by the data processing system 140. The tenant systems 110 shown can be owned or operated by the same or different entities. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the data processing system 140. Although the term "tenant" is used herein to describe the tenant systems 110 or owners/operators thereof, in addition to having its ordinary meaning, the term "tenant" can, but need not, refer to tenancy in a multitenant software architecture.

More specifically, the tenant systems 110 can include one or more computer systems 122 that are each communicably coupled to, or include, one or more managed data sources 120. The one or more managed data sources 120 can include data streams or datasets that can be processed by the data processing system 140. In various cases, the one or more data sources 120 can be updated by the computer systems 122, or other components, in real-time, on a periodic basis, e.g., according to a schedule, on-demand or a combination of the same.

In the illustrated embodiment, the data processing system 140 can include a data source manager 142, an AI-based data processor 144, an AI configurator 146, a data augmentation simulator 148, a model generator 150 and a reporting module 152. Each of these components can be implemented with hardware and/or software, including (optionally) virtual machines. In an example, the data processing system 140 can be implemented as a single management server. In another example, the data processing system 140 can be implemented in a plurality of virtual or physical servers, which may or may not be geographically co-located. In some embodiments, the data processing system 140 and/or other aspects of the computing environment 100 may be hosted on a cloud-provider system such as the Azure™ service provided by Microsoft® or the EC2™ platform provided by Amazon®.

In certain embodiments, features of the components of the data processing system 140 can be made accessible over an interface to the user systems 160. The user systems 160 can include any type of computing device, including computer systems such as desktops, laptops, tablets, smartphones, and wearable or body-borne computers, to name a few. The user systems 160 can be operated by users associated with the tenants or by other users.

The data source manager 142 can coordinate the managed data sources 120. In various embodiments, the data source manager 142 can identify, receive, pull, and/or communicate with the computer systems 122 so as to enable processing of the managed data sources 120. In some embodiments, the data source manager 142 can serve a data collection function. In these embodiments, the computer systems 122 can obtain or collect datasets in real-time, periodically, e.g., according to a schedule, on-demand, or a combination of the same. In some cases, such datasets can be provided as a live stream. In some cases, data from the managed data sources 120 can be collected and stored in the data store(s) 154. In other cases, the data can remain at the managed data sources 120.

The AI-based data processor 144 can process data according to a plurality of AI algorithms supported thereby, potentially using different AI models, representative of different configuration settings and/or AI algorithms, for different data sources. The processing performed by the AI-based data processor 144 can involve executing particular tasks with respect to the data such as, for example, data prediction, generation of new data, execution of configurable workflows, combinations of the foregoing and/or the like. For illustrative purposes, examples will be described herein relative to data prediction. A particular AI model that is used for each of the managed data sources 120 can be maintained by the AI-based data processor 144 and stored, for example, in data store(s) 154. As described in greater detail below, the particular AI model that is used for each of the managed data sources can be configurable and effected via, for example, operation of the AI configurator 146.

The AI configurator 146 can interact with the model generator 150 to individually adapt AI-based data processing to individual characteristics of each of the managed data sources 120. For example, at a time of instituting AI-based data processing of each managed data source of the managed data sources 120, or at any other time that may be desirable in a given implementation, the AI configurator 146 can receive, or identify, a training dataset that is representative of data to be provided by the managed data source and processed by the AI-based data processor 144. For any given managed data source of the managed data sources 120, the AI configurator 146 can use the model generator 150 to generate, and specially configure, candidate AI models for the given managed data source using the training dataset.

For example, in certain embodiments, the AI configurator 146 can publish a configuration interface to the user systems 160, for example, for administrators, super users or other users (e.g., of a particular tenant) to select or specify commands for initiating and/or providing data related to operation of the AI configurator 146. The data store(s) 154 can store AI frameworks that implement the AI algorithms, configuration settings of AI models and/or AI frameworks, and/or other data used by the AI configurator 146, the data augmentation simulator 148, the model generator 150 and/or other components of the computing environment 100.

The data augmentation simulator 148 can serve to create synthetic datasets that are used during AI-based processing. For example, in various embodiments, the synthetic dataset can be created by executing a series of intelligent algorithms that, among other things, extrapolate, balance, and validate data. The synthetic datasets can be used, for example, in conjunction with the data source manager 142, the AI-based data processor 144, and/or the AI configurator 146. Example operation of the data augmentation simulator 148 will be described in more detail relative to FIGS. 2-7.

The reporting module 152 can generate regular or on-demand reports related to the AI-based data processor 144, the AI configurator 146, the data augmentation simulator 148, the model generator 150 and/or any other component of the computing environment. The reporting module 152 can publish reports or other generated information, for example, to a web page, dashboard, and/or the like. The reporting module 152 can also generate and execute a query of the data store(s) 154. The web page, user dashboard or other user interface(s) output, for example, by the reporting module 152, can be accessed by users of the user systems 160. The reporting module 152 can also provide a user interface, for instance, that allows the users of the user systems 160 to obtain customized data related to any data maintained by the data store(s) 154.

In general, the data store(s) 154 can include any information collected, stored, used, produced and/or output by the data processing system 140 or a component thereof. For example, in various embodiments, the data store(s) 154 can include AI models, AI frameworks, identification of AI models used for particular managed data sources of the managed data sources 120, software, training datasets, data collected or received from the managed data sources 120, data processed by the AI-based data processor 144, combinations of the same and/or the like. In certain embodiments, data stored in the data store(s) 154 can take the form of repositories, flat files, databases, etc.

Figure 2:
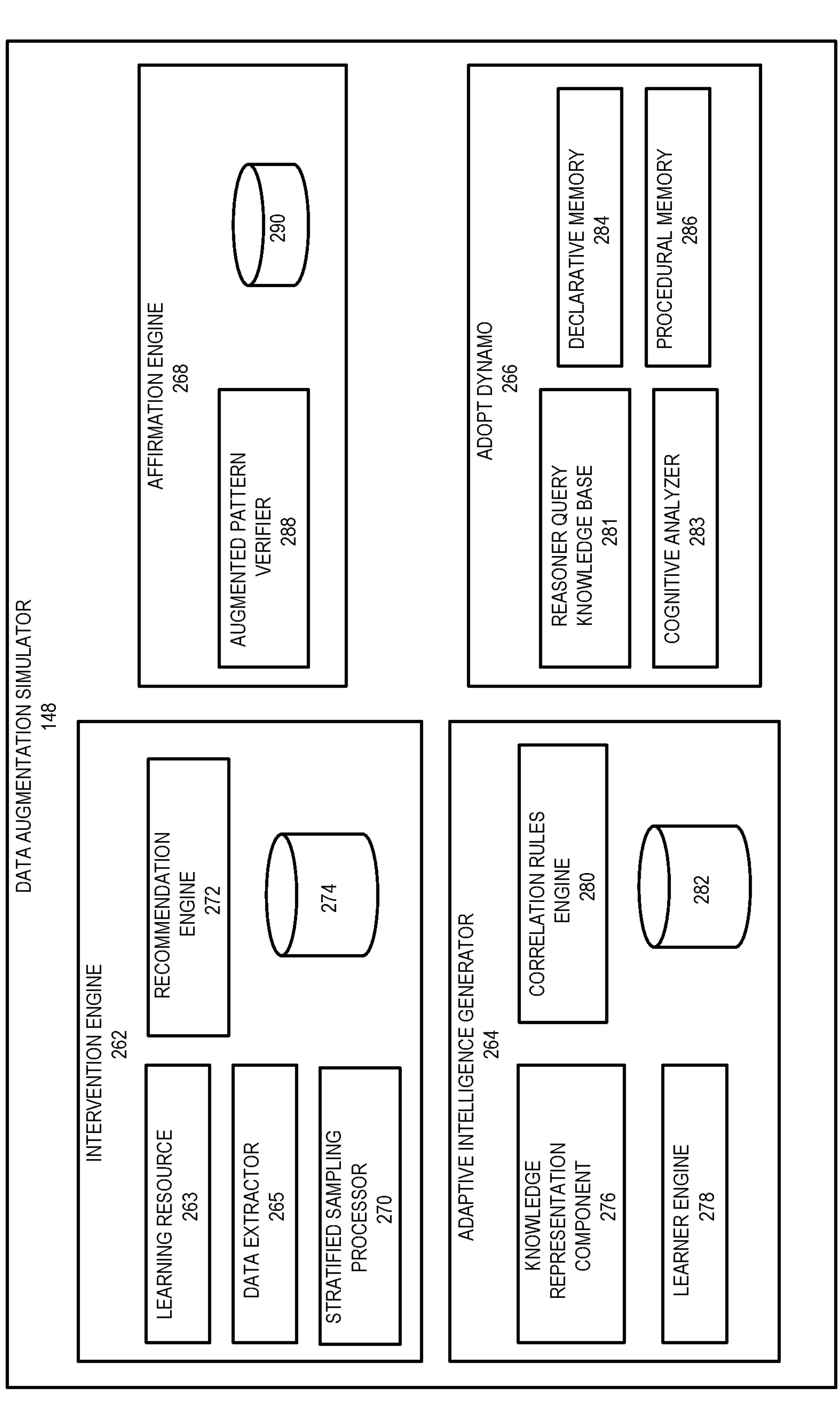
FIG. 2 illustrates a data augmentation simulator.

FIG. 2 illustrates the data augmentation simulator 148 of FIG. 1. The data augmentation simulator 148 includes an intervention engine 262, an adaptive intelligence generator 264, an adopt dynamo 266, and an affirmation engine 268. Although the data augmentation simulator 148 is described, for illustrative purposes, as including particular modules and/or submodules, it should be appreciated that the functionality of the data augmentation simulator 148 can distributed among any suitable number of modules and/or submodules without deviating from the principles described herein.

The intervention engine 262 includes a learning resource 263, a data extractor 265, a stratified sampling processor 270, a recommendation engine 272 and a staging database 274. Input data can be exported to the learning resource 263 by the data extractor 265 or another component. The input data can include, for example, various reliable sources of data collection including, but not limited to, image files, video files, speech or audio files, log files, document, spreadsheet, freeform text, structured text, optical character recognition (OCR) text, and the like. In various embodiments, the learning resource 263 can enhance learning for a broad spectrum of analysis. The learning resource 263 can apply, for example, a set of artificial intelligence (AI) algorithms.

The data extractor 265 is operable to collect data attributes from the input data based on the type of data. For example, in dependence on whether the data is an image file, video file, speech or audio file, log file, or another type of file or data, a different set of attributes can be extracted or collected from the input data. In various embodiments, the data attributes that are extracted can be specified rules or machine-generated intelligence for the type of data. For example, the data attributes that are extracted can be domain-specific or tailored to a specific domain (e.g., insurance, banking, etc.) In addition, or alternatively, attributes can be single-value attributes, multi-value attributes, derived attributes, key attributes, combinations of the foregoing and/or the like. In various embodiments, the data extractor 265 can further collect health and performance metrics from the data attributes. The health and performance metrics can include, for example, metrics related to data accuracy, recall, precision, sensitivity, specificity, combinations of the foregoing and/or the like. In some embodiments, the data extractor 265 can include a trace logger that collects the health and performance metrics.

Still with reference to the intervention engine 262, the stratified sampling processor 270 classifies the input data using the data attributes output by the data extractor 265 and performs class-imbalance removal so as to output a balanced dataset. In various embodiments, the classification can involve sorting or partitioning the input data, based on the data attributes, into strata that each represent subpopulations of the input data. In various cases, the classified input data can include class imbalances such that some of the subpopulations include vastly different numbers of samples. In certain embodiments, the performance of class-imbalance removal can involve generating the balanced dataset based on the classified input data. For example, for a given data attribute that distinguishes two strata, the class-imbalance removal can involve skewing the classified input data according to the ratio of majority to minority data samples, thereby generating the balanced dataset. The class-imbalance removal can include selective random oversampling and undersampling of the input data. Oversampling can include, for example, synthetic minority oversampling technique (SMOTE), adaptive synthetic oversampling, and/or the like. Undersampling can include utilization of techniques such as, for example, near miss, condensed nearest neighbor rule, Tomek links, edited nearest neighbor rule, neighborhood cleaning rule, and cluster centroids and/or the like. More particularly, as described in greater detail relative to FIG. 3, in various embodiments, the stratified sampling processor 270 can use proportionate stratified sampling and/or disproportionate stratified sampling.

Still with reference to the intervention engine 262, the recommendation engine 272 receives the balanced dataset from the stratified sampling processor 270 and cyclically performs data processing, modeling, and integration of the balanced dataset until the balanced dataset is set, or deemed ready, for the next phase as indicated, for example, by certain desired data having been attained. For example, in various embodiments, the recommendation engine 272 can predict common attributes of the balanced dataset and/or recommend which attributes of the balanced dataset to extrapolate. In various embodiments, the recommendation engine 272 serves as a data-filtering tool that utilizes data and algorithms to fetch relevant attributes such as those attributes which might have different names or entities but that are nonetheless similar to each other for purposes of collection, storage, analysis, and filtering of the balanced dataset. In certain embodiments, there may be explicit and implicit data collection by the recommendation engine 272. In an example, explicit data, or data that is explicitly collected, can include information that is provided intentionally (e.g., common inputs in the data). Implicit data can include information that is not provided intentionally but that is gathered from other available data streams such as historical data. In various cases, Euclidean distance can be used to find similar items that lie close to each other when plotted in n-dimensional space. Pearson's correlation can be used to find correlation, where higher correlation indicates more similarity.

The recommendation engine 272 can output integrated data, where the integrated data can include the balanced datasets integrated with data-attribute intelligence such as, for example, the predicted common attributes and/or the recommended attributes for extrapolation. In various cases, the integrated data can be output as a continuous data feed to the staging database 274. The staging database 274 can, in effect, store intermediate residue data received via a queuing system that handles the continuous data feed.

The adaptive intelligence generator 264 includes a knowledge representation component 276, a learner engine 278, a correlation rules engine 280 and a database 282. The knowledge representation component 276 performs real-time emulated knowledge representation of the integrated data from the staging database 274 to yield structured knowledge. The knowledge representation component 276 represents information about the world in a form that a computer system can utilize to solve complex tasks such as diagnosing a medical condition or having a dialog in a natural language. In various embodiments, the knowledge representation component 276 can operate by taking care of data translation and mapping so as to yield the structured knowledge. The structured knowledge can supply a formal mechanism for implementation of knowledge systems. For example, the structured knowledge can combine units and relations within its structure. The structured knowledge can include, for example, simple relation knowledge, inheritable knowledge, inferential knowledge, and/or the like.

Still with reference to the adaptive intelligence generator 264, the learner engine 278 is configured to apply intelligent data-augmentation algorithms to the structured knowledge, in real time, for adaptive data augmentation. The intelligent data-augmentation algorithms can include any mathematical algorithms, such as extrapolation algorithms, where the learner engine constantly learns about augmentation capabilities and desired outcomes. In various embodiments, the application of the intelligent data-augmentation algorithms produces raw augmented data. In various embodiments, the learner engine 278 can further produce, for each intelligent data-augmentation algorithm, statistical data indicative of a statistical analysis of the raw augmented data resulting from that algorithm. Example operation of the learner engine 278 will be described relative to FIG. 4.

The correlation rules engine 280 is configured to generate pattern summaries that indicate relationships between various variables in each set of the raw augmented data. For example, the correlation rules engine 280 can apply correlation rules and/or compute correlation coefficients (e.g., between pairs of variables), where such information can be included in the pattern summary for each set of the raw augmented data. In a typical embodiment, the pattern summaries are fed into the database 282 and queued for further processing. Example operation of the correlation rules engine 280 will be described relative to FIG. 5.

The adopt dynamo 266 includes a reasoner query knowledge base 281 and a cognitive analyzer 283. The reasoner query knowledge base 281 stores metadata for cognitive analysis. The cognitive analyzer 283 creates an extrapolated dataset from the raw augmented data. The extrapolated dataset can be created by cognitive data analysis using, for example, the reasoner query knowledge base 281 and an adopt algorithm. According to the adopt algorithm, depending upon the dataset and volume, machine learning and/or deep learning is selected for further processing. With respect to the extrapolated dataset, the cognitive analyzer 283 is operable to produce data that is split between a declarative memory 284 and a procedural memory 286. In an example, data related to a cognitive model can be stored in the declarative memory 284 and data related to facts can be stored in the procedural memory 286. In various embodiments, the declarative memory 284 and the procedural memory 286 of the adopt dynamo 266 act as a gatekeeping mechanism for optimizing the extrapolated dataset, which dataset can be output to a dashboard or other destination as data strips. Example operation of the adopt dynamo 266 will be described relative to FIG. 6.

The affirmation engine 268 includes an augmented pattern verifier 288 and a synthetic data repository 290. The augmented pattern verifier 288 analyzes and validates resultant datasets from various modules of the data augmentation simulator 148, such as the extrapolated datasets produced by the adopt dynamo 266. In certain embodiments, the datasets can be verified against stored patterns that ensure acceptable data proportions. In addition, or alternatively, the augmented pattern verifier 288 can determine prediction accuracies for the datasets. If the extrapolation has sufficient deviation from the stored patterns, fails to exhibit requisite accuracy, or meets other failure criteria, the affirmation engine 268 can force a return to the adaptive intelligence generator 264, for example, for purposes of re-doing extrapolation. Otherwise, the datasets may be validated and used as, or used to construct, a synthetic dataset that is stored in the synthetic data repository 290. In various embodiments, the data of the synthetic data repository 290 is final output data that, at least in part, has been artificially manufactured and is ready for use in AI, for example. The data of the synthetic data repository 290 may support data processing as described relative to FIG. 1.

Figure 3:
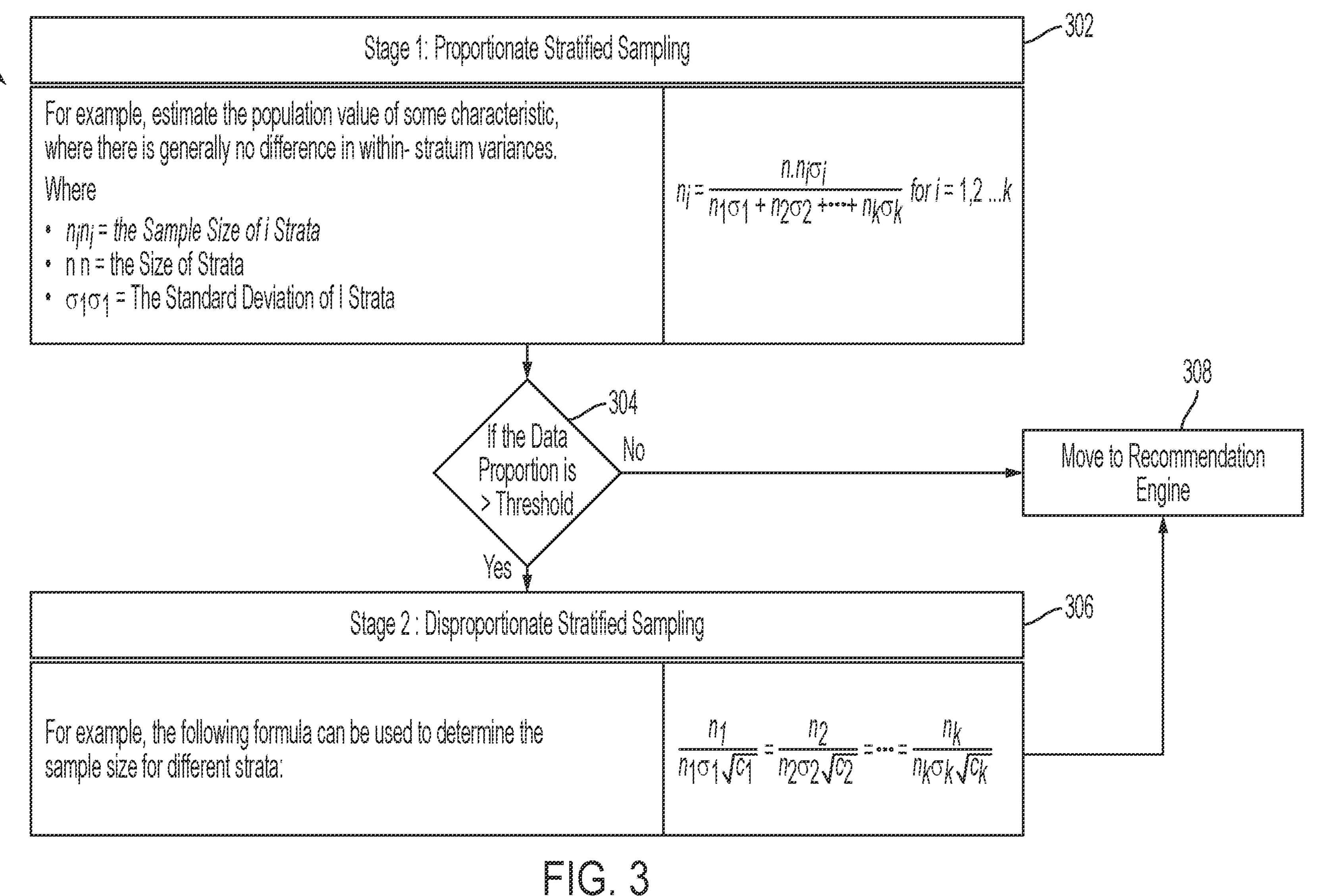
FIG. 3 illustrates an example of a process for stratified sampling.

FIG. 3 illustrates an example of a process 300 for stratified sampling using the stratified sampling processor 270 of FIG. 2. At block 302, the stratified sampling processor 270 executes proportionate stratified sampling of classified input data. At decision block 304, the stratified sampling processor 270 determines whether a data proportion of any stratum exceeds a configurable threshold (e.g., 10 percent or another suitable threshold). In a typical embodiment, the sample size of each stratum is deemed proportionate to the population size of the stratum if it exceeds the desired threshold. If the decision block 304 results in a negative determination, the process 300 proceeds to block 308, where the stratified sampling processor 270 allows processing to move to the recommendation engine 272. Otherwise, if the stratified sampling processor 270 determines at the decision block 304 that a data proportion exceeds the configurable threshold, at block 306, the stratified sampling processor 270 executes disproportionate stratified sampling of the classified input data. After block 306, the process 300 proceeds to block 308 and executes as described previously.

Figure 4:
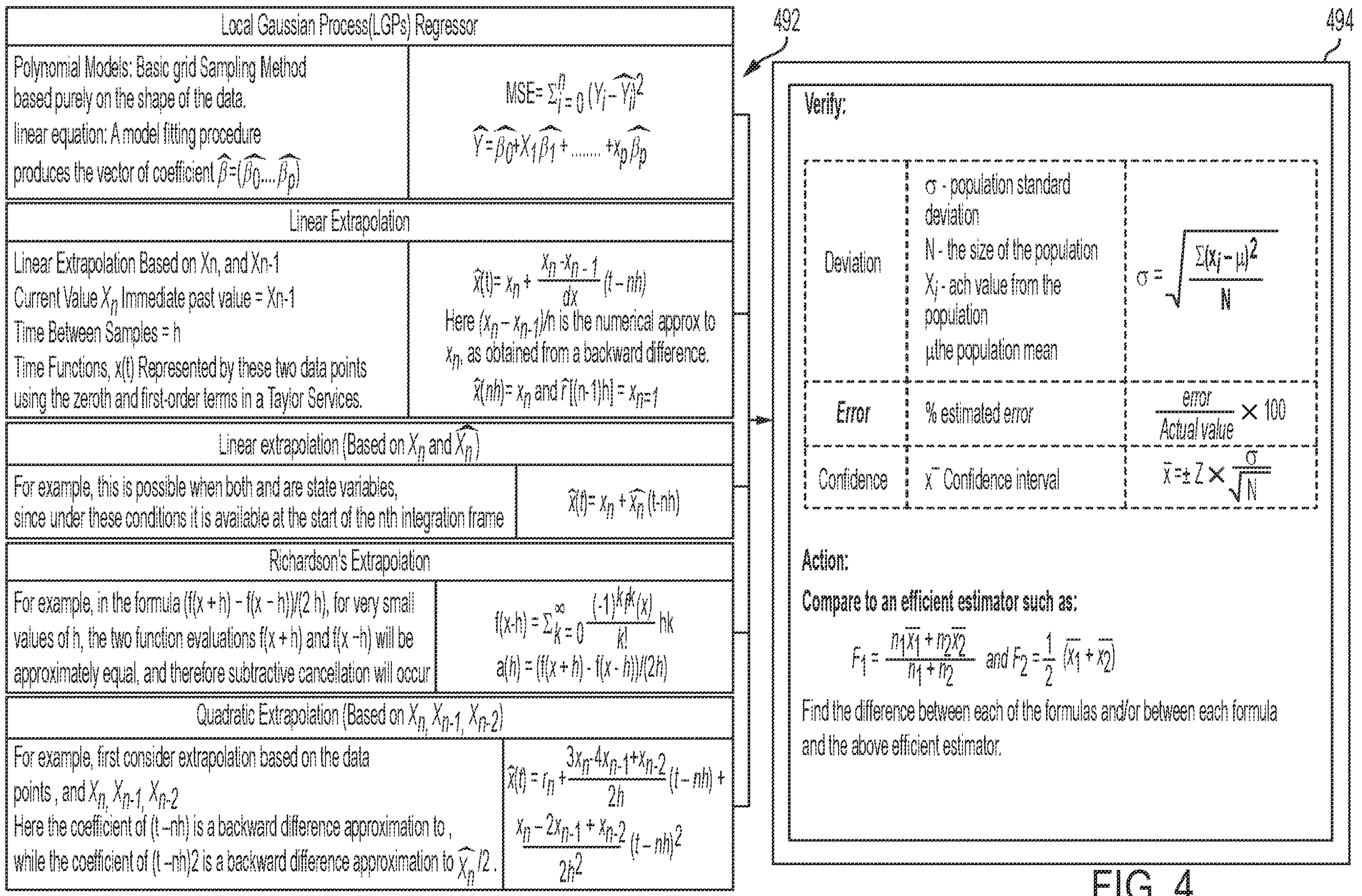
FIG. 4 illustrates an example of functionality that can be performed by a learner engine.

FIG. 4 illustrates an example of functionality that can be performed by the learner engine 278 of FIG. 2. In the example of FIG. 4, extrapolation algorithms 492 can each be applied, for example, to structured knowledge generated by the knowledge representation component 276. The extrapolation algorithms 492 can include, for example, any of the extrapolation algorithms shown in FIG. 4 and/or any other suitable algorithm. Outputs of the extrapolation algorithms 492 can serve as all or part of the raw augmented data discussed previously, which data can be submitted for analysis 494.

The analysis 494 can include verification steps such as calculating standard deviations, error, confidence intervals, and/or the like. In another example, the analysis 494 can include action steps such as, for example, comparing outputs of the extrapolation algorithms 492 to outputs of one or more target extrapolation algorithms such as, for example, others of the extrapolation algorithms 492, another pre-selected extrapolation algorithm (e.g., an efficient estimator as shown in FIG. 4), a particular one of the extrapolation algorithms that is deemed best by any suitable metric (e.g., error, confidence, etc.), combinations of the foregoing and/or the like. In various embodiments, outputs of the analysis 494 can serve as all or part of the statistical data produced by the learner engine 278.

FIG. 5 illustrates an example of functionality that can be performed by the correlation rules engine 280 of FIG. 2. In the example of FIG. 5, a correlation analysis 596 can be applied, for example, to the raw augmented data produced by the learner engine 278. In various embodiments, the correlation analysis 596 can include, for example, generation of correlation coefficients between pairs of variables (e.g., corresponding to data attributes that have been extrapolated).

Figure 6:
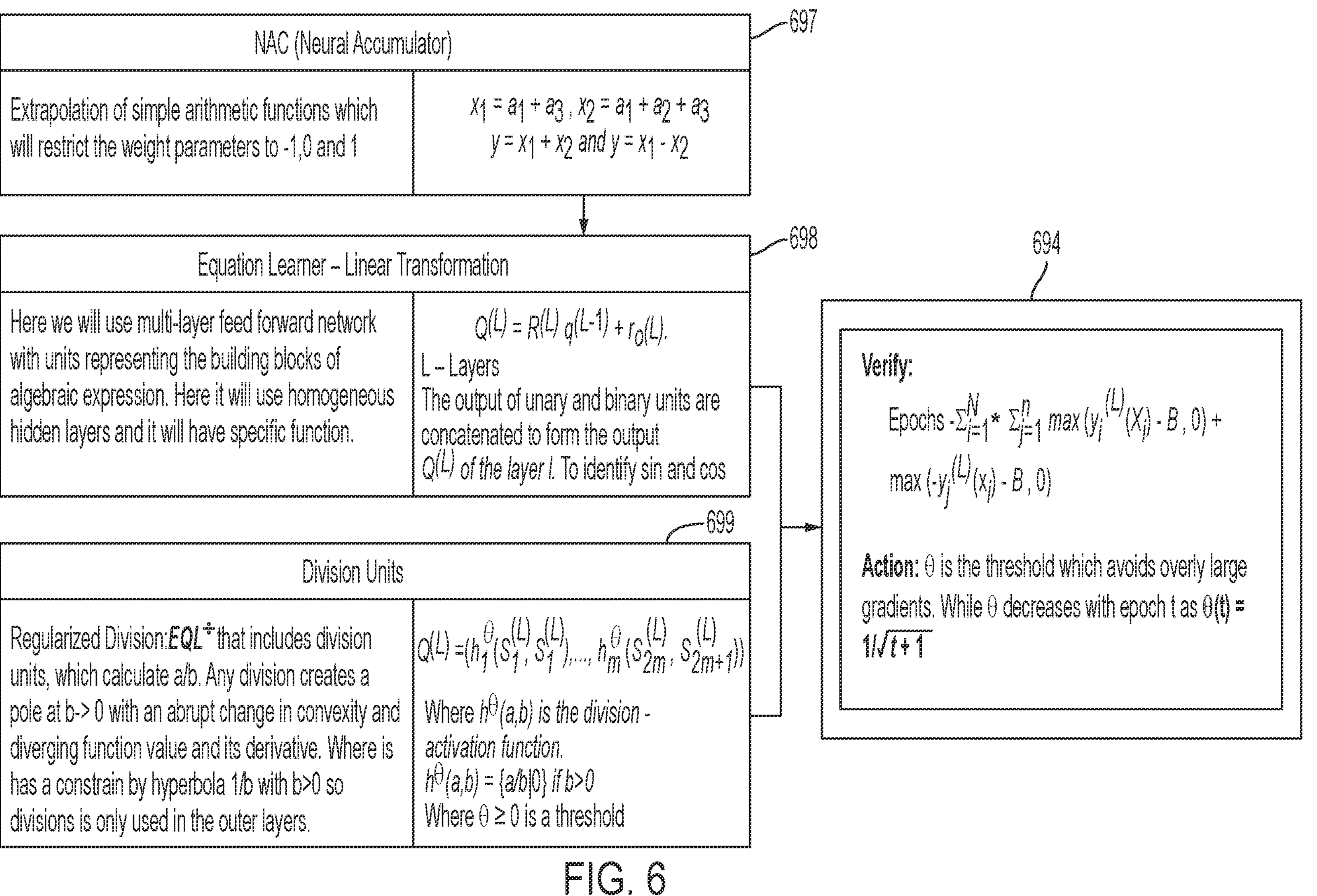
FIG. 6 illustrates an example of functionality that can be performed by an adopt dynamo.

FIG. 6 illustrates an example of functionality that can be performed by the adopt dynamo 266. As illustrated, the adopt dynamo 266, or more particularly the cognitive analyzer 283, can apply a neural accumulator 697, an equation learner 698, and a division algorithm 699. In the illustrated embodiment, the neural accumulator 697 and the equation learner 698 are performed in sequence, with all three of the neural accumulator 697, the equation learner 698 and the division algorithm 699 providing their outputs for analysis 694. In various embodiments, the analysis 694 can include verification steps and action steps as illustrated. In various embodiments, the analysis 694 can enable avoidance of overly large gradients, for example, in extrapolated datasets.

Figure 7:
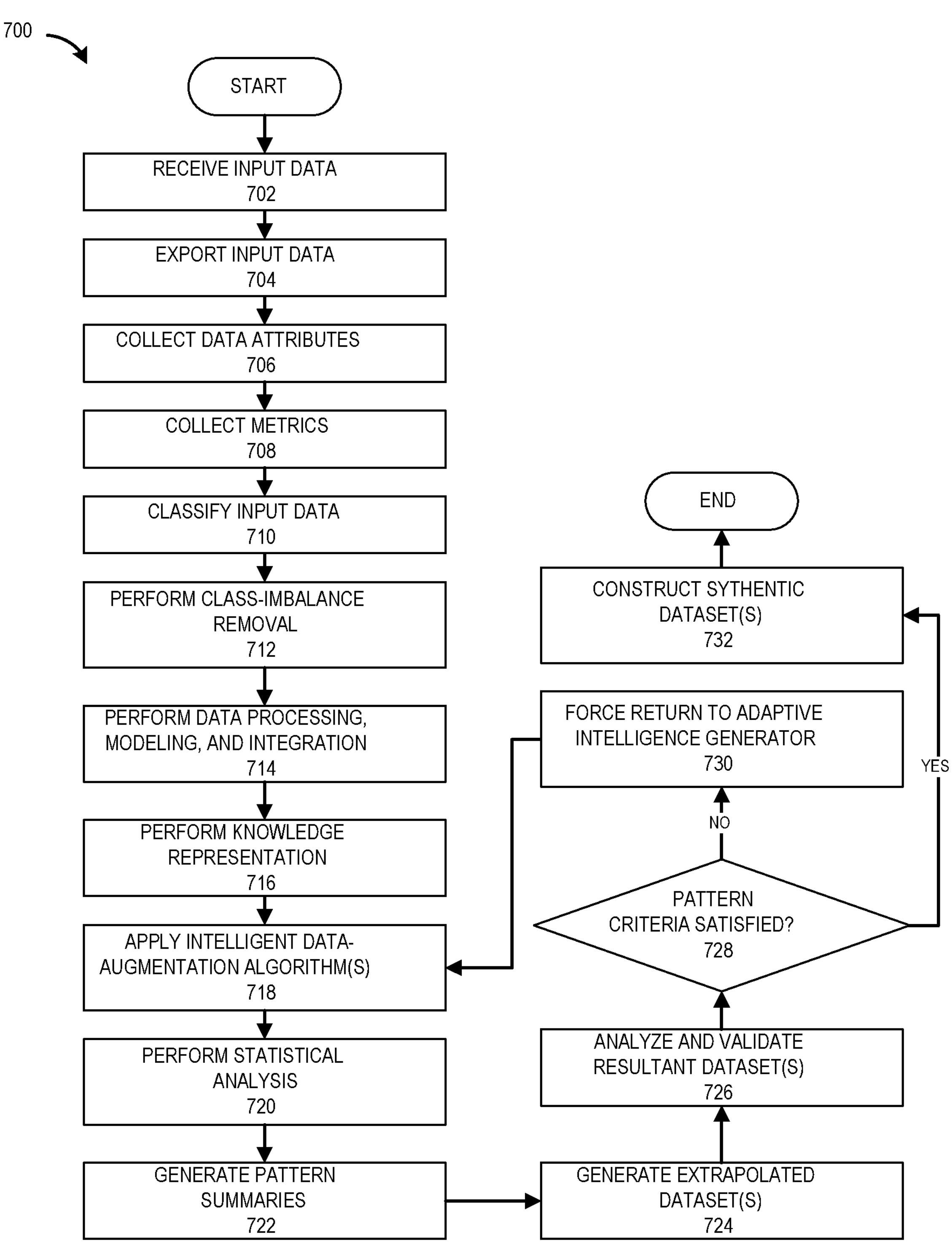
FIG. 7 illustrates an example of a process for executing a method of simulating data augmentation.

FIG. 7 illustrates an example of a process 700 for executing a method of simulating data augmentation. In certain embodiments, the process 700 can be executed, for example, by the data source manager 142, the AI-based data processor 144, the AI configurator 146, the data augmentation simulator 148, the model generator 150 and/or the reporting module 152, all of FIG. 1. The process 700 can also be executed generally by the data processing system 140 of FIG. 1. Although the process 700 can be executed by any number of different components, to simplify discussion, the process 700 will be described relative to the data augmentation simulator 148 and specific components thereof.

At block 702, with reference to the intervention engine 262, the data extractor 265 receives input data such as, for example, historical data from a different domain. At block 704, the data extractor 265 exports the input data to the learning resource 263 for continued learning according to AI algorithms. At block 706, the data extractor 265 collects data attributes from the input data based on a type of the input data. At block 708, the data extractor 265 collects metrics, such as health and performance metrics, from the data attributes.

At block 710, still with reference to the intervention engine 262, the stratified sampling processor 270 classifies the input data using the data attributes, for example, by sorting or partitioning the input data into strata that each represent a subpopulation of the input data. At block 712, the stratified sampling processor 270 performs class-imbalance removal on the input data so to generate, or output, a balanced dataset as described previously. At block 714, the recommendation engine 272 creates integrated data. In a typical embodiment, the creation at the block 714 can include cyclically performing data processing, modeling, and integration on the balanced dataset until the data is set for the next phase. In a typical embodiment, the block 714 yields integrated data that can include, for example, one or more balanced datasets that have been enhanced with data-attribute intelligence such as predictions and recommendations as described previously.

At block 716, with reference to the adaptive intelligence generator 264, the knowledge representation component 276 performs real-time emulated knowledge representation of the integrated data. In various embodiments, the block 716 can yield structured knowledge, which data is arranged or structured for use in executing one or more complex tasks such as diagnosing a medical condition, having a dialog in a natural language and/or the like.

At block 718, still with reference to the adaptive intelligence generator 264, the learner engine 278 applies intelligent data-augmentation algorithms, in real time, to the structured knowledge so as to yield, for example, raw augmented data. For example, the raw augmented data can result from an application of one or more extrapolation algorithms. In various embodiments, a set of raw augmented data can result from each extrapolation algorithm that is applied.

At block 720, the learner engine 278 performs a statistical analysis of the raw augmented data. As described previously relative to FIG. 4, the statistical analysis can yield statistical data indicative of the statistical analysis. At block 722, the correlation rules engine 280 generates pattern summaries that indicate relationships between various variables in each set of the raw augmented data. At block 724, with reference to the adopt dynamo 266, the cognitive analyzer 283 generates an extrapolated dataset from the raw augmented data as described relative to FIGS. 2 and 5. At block 726, with reference to the affirmation engine 268, the augmented pattern verifier 288 analyzes and validates a resultant dataset, such as the extrapolated dataset from the block 724.

At decision block 728, the augmented pattern verifier 288 determines whether the resultant dataset satisfies pattern criteria that can include, for example, the stored patterns described relative to FIG. 2. If it is determined at the decision block 728 that the resultant dataset fails to satisfy the pattern criteria, at block 730, the augmented pattern verifier 288 forces a return to the adaptive intelligence generator 264, for example, for purposes of re-doing, or re-applying, the extrapolation algorithms. From block 730, the process 700 returns to the block 718 and executes as described previously. In some cases, rather than returning to the block 718, the process 700 can end. Otherwise, if it is determined at the decision block 728 that the resultant dataset satisfies the pattern criteria, the process 700 proceeds to block 732.

At block 732, the augmented pattern verifier 288 constructs a synthetic dataset that is stored in the synthetic data repository 290, where the synthetic dataset is at least partly based on the resultant dataset. In some cases, block 732 can involve publishing the resultant dataset, in its existing format, to the synthetic data repository 290. In other cases, the block 732 can include at least some restructuring or reformatting according to a structure of format used by the synthetic data repository 290. After block 732, the process 700 ends.

Figure 8:
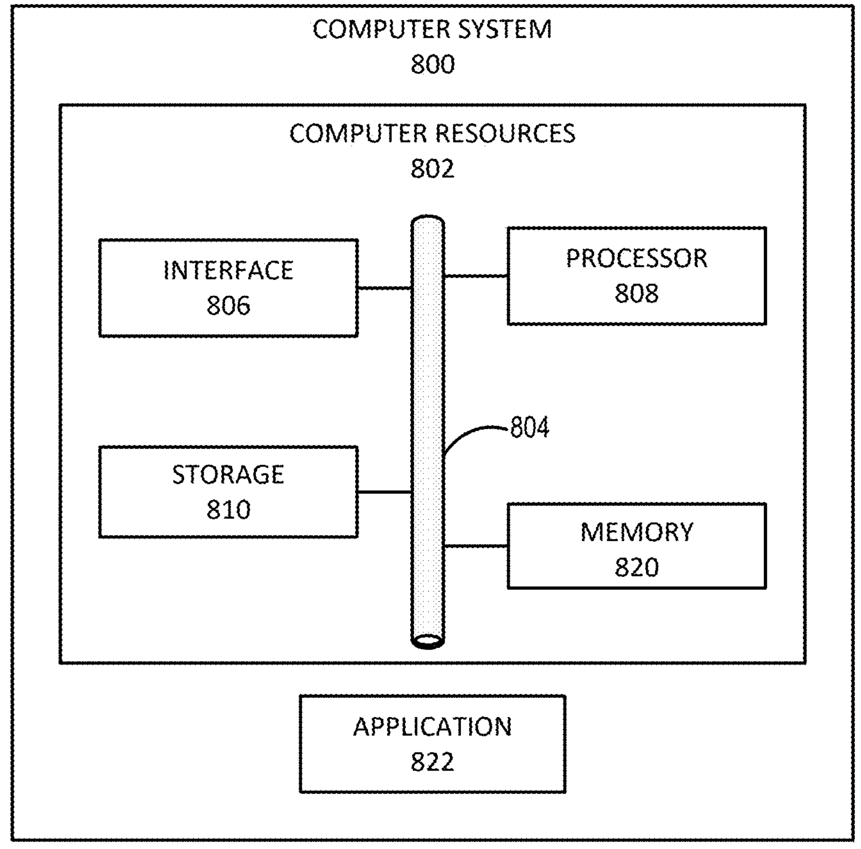
FIG. 8 illustrates an example of a computer system.

FIG. 8 illustrates an example of a computer system 800. In some cases, the computer system 800 can be representative, for example, of any of the tenant systems 110 or components thereof, the user systems 160, and/or the data processing system 140 or components thereof. The computer system 800 includes an application 822 operable to execute on computer resources 802. The application 822 can include or embody, for example, any of the modules of the data processing system 140. In particular embodiments, the computer system 800 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 800 may include any suitable physical form, configuration, number, type and/or layout. As an example, and not by way of limitation, the computer system 800 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 800 may include one or more computer systems; be unitary or distributed; span multiple locations; span multiple machines; or reside in a cloud, which may include one or more cloud components in one or more networks.

In the depicted embodiment, the computer system 800 includes a processor 808, memory 820, storage 810, interface 806 and bus 804. Although a particular computer system is depicted having a particular number of particular components in a particular arrangement, this disclosure contemplates any suitable computer system having any suitable number of any suitable components in any suitable arrangement.

Processor 808 may be a microprocessor, controller, or any other suitable computing device, resource, or combination of hardware, software and/or encoded logic operable to execute, either alone or in conjunction with other components, (e.g., memory 820), the application 822. Such functionality may include providing various features discussed herein. In particular embodiments, processor 808 may include hardware for executing instructions, such as those making up the application 822. As an example, and not by way of limitation, to execute instructions, processor 808 may retrieve (or fetch) instructions from an internal register, an internal cache, memory 820, or storage 810; decode and execute them; and then write one or more results to an internal register, an internal cache, memory 820, or storage 810.

In particular embodiments, processor 808 may include one or more internal caches for data, instructions, or addresses. This disclosure contemplates processor 808 including any suitable number of any suitable internal caches, where appropriate. As an example, and not by way of limitation, processor 808 may include one or more instruction caches, one or more data caches and one or more translation lookaside buffers (TLBs). Instructions in the instruction caches may be copies of instructions in memory 820 or storage 810 and the instruction caches may speed up retrieval of those instructions by processor 808. Data in the data caches may be copies of data in memory 820 or storage 810 for instructions executing at processor 808 to operate on; the results of previous instructions executed at processor 808 for access by subsequent instructions executing at processor 808, or for writing to memory 820, or storage 810; or other suitable data. The data caches may speed up read or write operations by processor 808. The TLBs may speed up virtual-address translations for processor 808. In particular embodiments, processor 808 may include one or more internal registers for data, instructions, or addresses. Depending on the embodiment, processor 808 may include any suitable number of any suitable internal registers, where appropriate. Where appropriate, processor 808 may include one or more arithmetic logic units (ALUs); be a multi-core processor; include one or more processors 808; or any other suitable processor.

Memory 820 may be any form of volatile or non-volatile memory including, without limitation, magnetic media, optical media, random access memory (RAM), read-only memory (ROM), flash memory, removable media, or any other suitable local or remote memory component or components. In particular embodiments, memory 820 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 820 may include one or more memories 820, where appropriate. Memory 820 may store any suitable data or information utilized by the computer system 800, including software embedded in a computer readable medium and/or encoded logic incorporated in hardware or otherwise stored (e.g., firmware). In particular embodiments, memory 820 may include main memory for storing instructions for processor 808 to execute or data for processor 808 to operate on. In particular embodiments, one or more memory management units (MMUs) may reside between processor 808 and memory 820 and facilitate accesses to memory 820 requested by processor 808.

As an example, and not by way of limitation, the computer system 800 may load instructions from storage 810 or another source (such as, for example, another computer system) to memory 820. Processor 808 may then load the instructions from memory 820 to an internal register or internal cache. To execute the instructions, processor 808 may retrieve the instructions from the internal register or internal cache and decode them. During or after execution of the instructions, processor 808 may write one or more results (which may be intermediate or final results) to the internal register or internal cache. Processor 808 may then write one or more of those results to memory 820. In particular embodiments, processor 808 may execute only instructions in one or more internal registers or internal caches or in memory 820 (as opposed to storage 810 or elsewhere) and may operate only on data in one or more internal registers or internal caches or in memory 820 (as opposed to storage 810 or elsewhere).

In particular embodiments, storage 810 may include mass storage for data or instructions. As an example, and not by way of limitation, storage 810 may include a hard disk drive (HDD), a floppy disk drive, flash memory, an optical disc, a magneto-optical disc, magnetic tape, or a Universal Serial Bus (USB) drive or a combination of two or more of these. Storage 810 may include removable or non-removable (or fixed) media, where appropriate. Storage 810 may be internal or external to the computer system 800, where appropriate. In particular embodiments, storage 810 may be non-volatile, solid-state memory. In particular embodiments, storage 810 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 810 may take any suitable physical form and may include any suitable number or type of storage. Storage 810 may include one or more storage control units facilitating communication between processor 808 and storage 810, where appropriate.

In particular embodiments, interface 806 may include hardware, encoded software, or both providing one or more interfaces for communication (such as, for example, packet-based communication) among any networks, any network devices and/or any other computer systems. As an example, and not by way of limitation, communication interface 806 may include a network interface controller (NIC) or network adapter for communicating with an Ethernet or other wire-based network and/or a wireless NIC (WNIC) or wireless adapter for communicating with a wireless network.

Depending on the embodiment, interface 806 may be any type of interface suitable for any type of network for which computer system 800 is used. As an example, and not by way of limitation, computer system 800 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 800 may include any suitable interface 806 for any one or more of these networks, where appropriate.

In some embodiments, interface 806 may include one or more interfaces for one or more I/O devices. One or more of these I/O devices may enable communication between a person and the computer system 800. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An VO device may include one or more sensors. Particular embodiments may include any suitable type and/or number of I/O devices and any suitable type and/or number of interfaces 806 for them. Where appropriate, interface 806 may include one or more drivers enabling processor 808 to drive one or more of these I/O devices. Interface 806 may include one or more interfaces 806, where appropriate.

Bus 804 may include any combination of hardware, software embedded in a computer readable medium and/or encoded logic incorporated in hardware or otherwise stored (e.g., firmware) to couple components of the computer system 800 to each other. As an example, and not by way of limitation, bus 804 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 804 may include any number, type and/or configuration of buses 804, where appropriate. In particular embodiments, one or more buses 804 (which may each include an address bus and a data bus) may couple processor 808 to memory 820. Bus 804 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 808 (such as, for example, one or more internal registers or caches), one or more portions of memory 820, one or more portions of storage 810, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of simulating data augmentation, the method comprising, by a computer system:

receiving input data;

collecting data attributes from the input data based, at least in part, on a type of the input data;

classifying the input data using the data attributes, the classifying comprising partitioning the input data into a plurality of strata that each represent a subpopulation of the input data;

performing class-imbalance removal on the classified input data by executing at least a first stage and a second stage of stratified sampling, the performing yielding a balanced dataset, the performing comprising:

at the first stage of stratified sampling, executing proportionate stratified sampling of the classified input data;

responsive to the executing, determining, for each stratum of the plurality of strata, whether a sample size of the stratum exceeds a defined threshold; and responsive to a determination that the sample size of at least one stratum of the plurality of strata exceeds the defined threshold, at the second stage of stratified sampling, executing disproportionate stratified sampling of the classified input data;

creating integrated data by cyclically performing data processing, modeling, and integration on the balanced dataset, the integrated data comprising the balanced dataset integrated with data-attribute intelligence comprising at least one recommended data attribute of the balanced dataset for extrapolation;

representing at least a portion of the integrated data as structured knowledge for execution of a particular task;

applying a plurality of extrapolation algorithms to the structured knowledge to yield raw augmented data, wherein the applying is at least partly based on the at least one recommended data attribute for extrapolation;

generating an extrapolated dataset using the raw augmented data;

validating the extrapolated dataset by verifying the extrapolated dataset against stored patterns that ensure acceptable data proportions;

responsive to a determination that the extrapolated dataset fails to satisfy the stored patterns, reapplying the plurality of extrapolation algorithms to the structured knowledge;

constructing a synthetic dataset based on the extrapolated dataset, wherein the constructing is performed responsive to a determination that the extrapolated dataset satisfies the stored patterns; and using the synthetic dataset for artificial intelligence-based data processing in relation to the particular task.

2. The method of claim 1, the using comprising using the synthetic dataset as a training dataset for an artificial intelligence model.

3. The method of claim 1, further comprising outputting the integrated data as a continuous data feed to a staging database.

4. The method of claim 1, wherein the creating the integrated data comprises cyclically performing data processing, modeling and integration of the balanced dataset until desired data is attained.

5. The method of claim 4, wherein the creating the integrated data comprises recommending the at least one recommended data attribute of the balanced dataset.

6. The method of claim 4, wherein the creating the integrated data comprises predicting one or more common attributes of the balanced dataset, the data-attribute intelligence comprising the predicted one or more common attributes.

7. The method of claim 1, wherein the plurality of extrapolation algorithms comprise local Gaussian process regression, linear extrapolation, Richardson's extrapolation, and quadratic extrapolation.

8. The method of claim 1, the generating the extrapolated dataset comprising:
- applying a neural accumulator to at least a portion of the raw augmented data;
- responsive to the applying the neural accumulator, applying an equation learner to at least a portion of the raw augmented data;
- applying a division algorithm to at least a portion of the raw augmented data; and
- executing analysis using outputs from the neural accumulator, the equation learner and the division algorithm.

9. The method of claim 8, wherein the generating produces data that is split between a declarative memory and a procedural memory, the declarative memory storing data related to a cognitive model and the procedural memory storing data related to facts.

10. The method of claim 1, comprising exporting the input data to a learning resource.

11. The method of claim 1, comprising performing a statistical analysis of the raw augmented data, the performing the statistical analysis comprising:
- executing verification of the raw augmented data; and
- comparing outputs of the plurality of extrapolation algorithms to an output of a target extrapolation algorithm.

12. The method of claim 11, wherein the executing the verification comprises calculating a standard deviation, error, and confidence interval.

13. The method of claim 1, comprising generating pattern summaries that indicate relationships between a plurality of variables in the raw augmented data.

14. The method of claim 13, the generating the pattern summaries comprising computing correlation coefficients that indicate strength of relationship between variable pairs.

15. The method of claim 1, wherein the constructing comprises publishing the extrapolated dataset to a synthetic data repository.

16. The method of claim 1, comprising collecting health and performance metrics from the data attributes.

17. A computer system comprising a processor and memory, wherein the processor and the memory in combination are operable to implement a method comprising:
- receiving input data;
- collecting data attributes from the input data based, at least in part, on a type of the input data;
- classifying the input data using the data attributes, the classifying comprising partitioning the input data into a plurality of strata that each represent a subpopulation of the input data;
- performing class-imbalance removal on the classified input data by executing at least a first stage and a second stage of stratified sampling, the performing yielding a balanced dataset, the performing comprising:
  - at the first stage of stratified sampling, executing proportionate stratified sampling of the classified input data;
  - responsive to the executing, determining, for each stratum of the plurality of strata, whether a sample size of the stratum exceeds a defined threshold; and
  - responsive to a determination that the sample size of at least one stratum of the plurality of strata exceeds the defined threshold, at the second stage of stratified sampling, executing disproportionate stratified sampling of the classified input data;
- creating integrated data by cyclically performing data processing, modeling, and integration on the balanced dataset, the integrated data comprising the balanced dataset integrated with data-attribute intelligence comprising at least one recommended data attribute of the balanced dataset for extrapolation;
- representing at least a portion of the integrated data as structured knowledge for execution of a particular task;
- applying a plurality of extrapolation algorithms to the structured knowledge to yield raw augmented data, wherein the applying is at least partly based on the at least one recommended data attribute for extrapolation;
- generating an extrapolated dataset using the raw augmented data;
- validating the extrapolated dataset by verifying the extrapolated dataset against stored patterns that ensure acceptable data proportions;
- responsive to a determination that the extrapolated dataset fails to satisfy the stored patterns, reapplying the plurality of extrapolation algorithms to the structured knowledge;
- constructing a synthetic dataset based on the extrapolated dataset, wherein the constructing is performed responsive to a determination that the extrapolated dataset satisfies the stored patterns; and
- using the synthetic dataset for artificial intelligence-based data processing in relation to the particular task.

18. A computer-program product comprising a non-transitory computer-usable medium having computer-readable program code embodied therein, the computer-readable program code adapted to be executed to implement a method comprising:
- receiving input data;
- collecting data attributes from the input data based, at least in part, on a type of the input data;
- classifying the input data using the data attributes, the classifying comprising partitioning the input data into a plurality of strata that each represent a subpopulation of the input data;
- performing class-imbalance removal on the classified input data by executing at least a first stage and a second stage of stratified sampling, the performing yielding a balanced dataset, the performing comprising:
  - at the first stage of stratified sampling, executing proportionate stratified sampling of the classified input data;
  - responsive to the executing, determining, for each stratum of the plurality of strata, whether a sample size of the stratum exceeds a defined threshold; and
  - responsive to a determination that the sample size of at least one stratum of the plurality of strata exceeds the defined threshold, at the second stage of stratified sampling, executing disproportionate stratified sampling of the classified input data;
- creating integrated data by cyclically performing data processing, modeling, and integration on the balanced dataset, the integrated data comprising the balanced dataset integrated with data-attribute intelligence comprising at least one recommended data attribute of the balanced dataset for extrapolation;

representing at least a portion of the integrated data as structured knowledge for execution of a particular task;

applying a plurality of extrapolation algorithms to the structured knowledge to yield raw augmented data, wherein the applying is at least partly based on the at least one recommended data attribute for extrapolation;

generating an extrapolated dataset using the raw augmented data;

validating the extrapolated dataset by verifying the extrapolated dataset against stored patterns that ensure acceptable data proportions;

responsive to a determination that the extrapolated dataset fails to satisfy the stored patterns, reapplying the plurality of extrapolation algorithms to the structured knowledge;

constructing a synthetic dataset based, at least in part, on the extrapolated dataset; and using the synthetic dataset for artificial intelligence-based data processing in relation to the particular task.

* * * * *